No. 836,335. PATENTED NOV. 20, 1906.
H. & C. G. NICHOLS.
DEVICE FOR DISCHARGING LIQUIDS.
APPLICATION FILED JULY 3, 1905.

3 SHEETS—SHEET 1.

Witnesses.
Inventor.
Henry Nichols
Charles G. Nichols
By Benedict & Morsell
Attorneys.

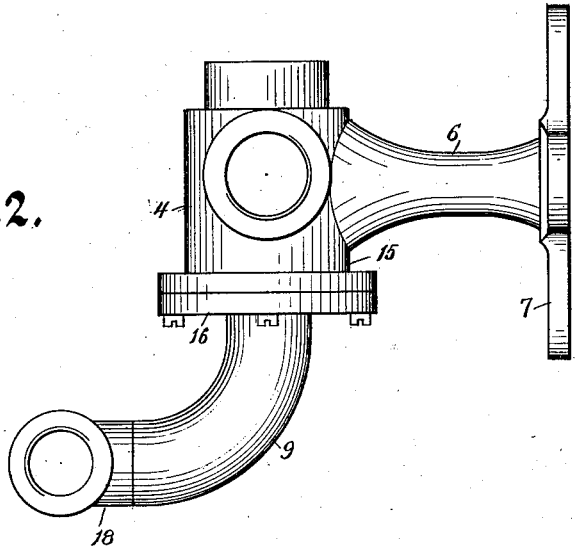
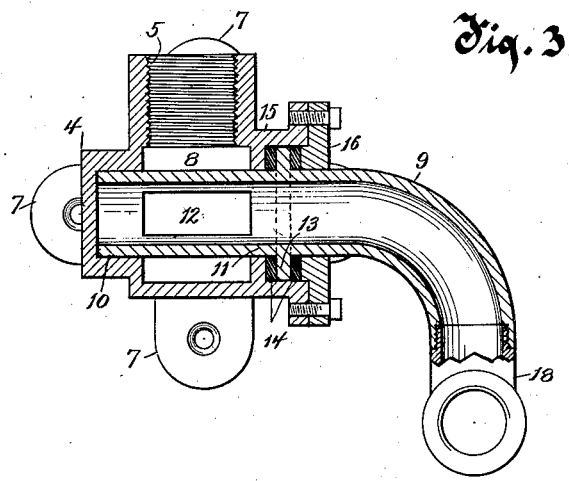

No. 836,335. PATENTED NOV. 20, 1906.
H. & C. G. NICHOLS.
DEVICE FOR DISCHARGING LIQUIDS.
APPLICATION FILED JULY 3, 1905.

3 SHEETS—SHEET 3.

UNITED STATES PATENT OFFICE.

HENRY NICHOLS AND CHARLES G. NICHOLS, OF APPLETON, WISCONSIN.

DEVICE FOR DISCHARGING LIQUIDS.

No. 836,335.   Specification of Letters Patent.   Patented Nov. 20, 1906.

Application filed July 3, 1905. Serial No. 268,048.

*To all whom it may concern:*

Be it known that we, HENRY NICHOLS and CHARLES G. NICHOLS, residing in Appleton, in the county of Outagamie and State of Wisconsin, have invented new and useful Improvements in Devices for Discharging Liquids, of which the following is a description, reference being had to the accompanying drawings, which are a part of this specification.

Our invention relates to improvements in devices adapted to be employed in tanks or elsewhere where there is a varying height of the water or liquid to be discharged, the device being adapted automatically to change its position and to take and maintain a position with constant reference to the height of the liquid being discharged, the device embodying incidentally a liquid-purifier in the nature of a strainer or filter adapted to separate and remove from the liquid all solid or foreign substances and exclude them from passing through the discharging device.

As our improved device will be more likely to be used chiefly in connection with tanks for filtering and discharging water therefrom, we have shown it in connection with a tank, thereby illustrating the use to which the device can be put and in such manner as it is likely to be chiefly used.

The invention consists of the device, its parts and combinations of parts, as herein described and claimed, or the equivalents thereof.

Figure 1:
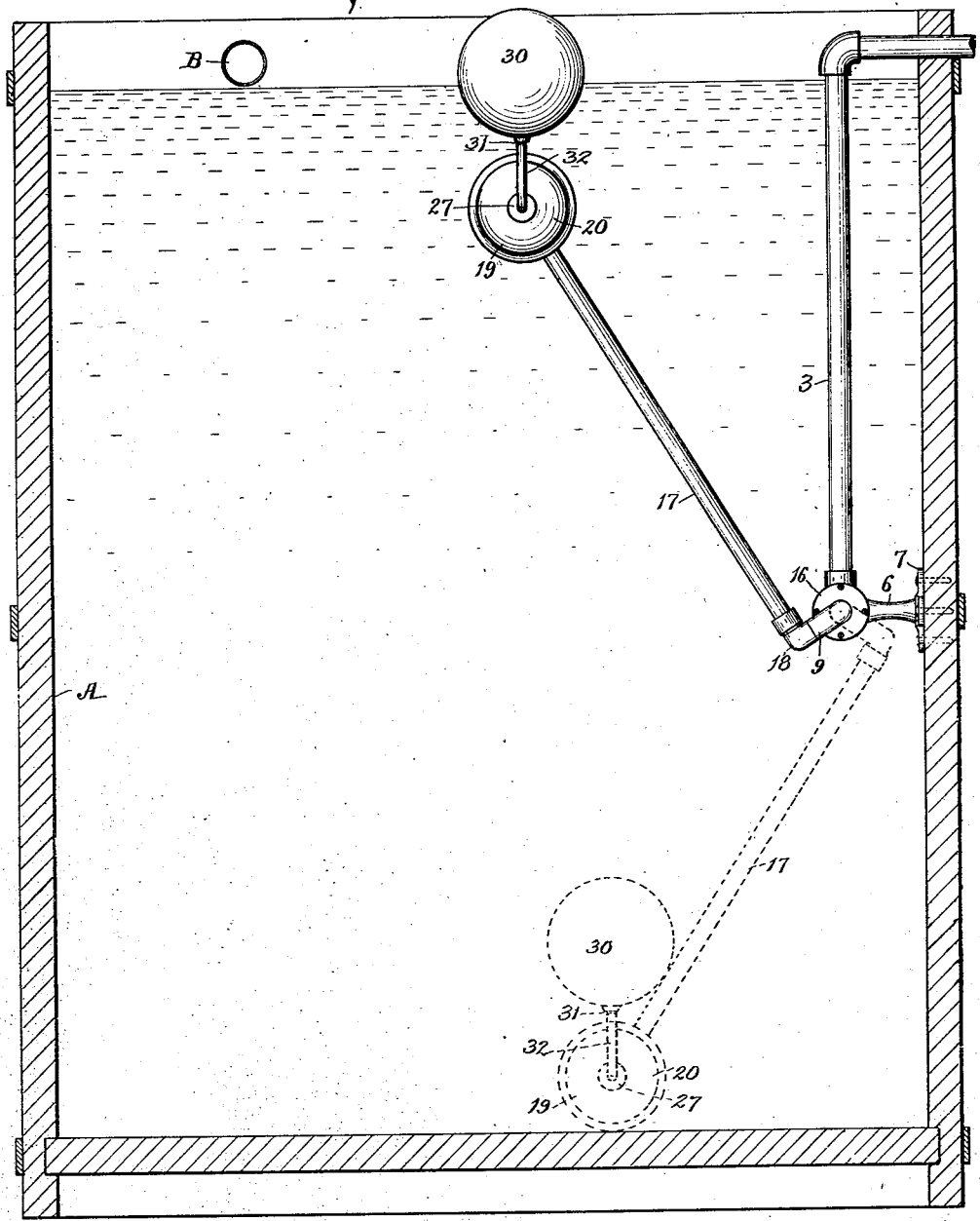
Figure 4:
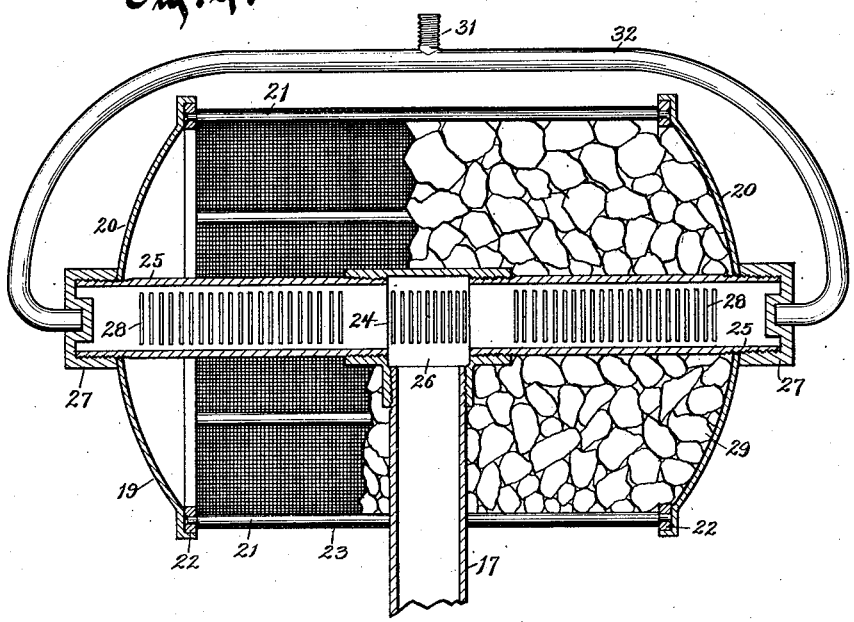
Figure 5:
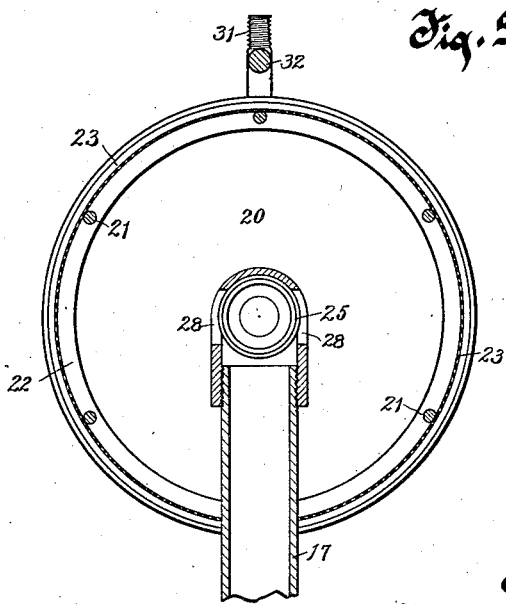

In the drawings, Figure 1 shows a tank in vertical section having a supply of water therein with our improved device therewith, showing the manner of mounting it and of its use. Fig. 2 is a plan of that part of our improved device that is directly connected to the supporting-wall of the tank, with the part that forms a movable connection therewith. Fig. 3 is a section of the parts forming the movable joint in that part of the device shown in plan in Fig. 2. Fig. 4 is a section of the filter forming the port of the discharging device, the rod or bail for attaching the float thereto being shown in full lines; and Fig. 5 is a central vertical section through the structure shown in Fig. 4.

In the drawings, A represents a tank, of a form with which our improved device may be employed. No means are shown for supplying the tank with liquid, but this may be by any suitable or desirable means whatever.

B is the port of an overflow-pipe adapted to prevent the undue filling of the tank with water or liquid.

3 is a pipe leading from the tank to a pump or other means for forcibly withdrawing the water or liquid from the tank. The inner and lower end of this pump-pipe 3 terminates in a head 4, in which it is fitted and held detachably by a screw-thread connection 5. This head 4 is provided with a rigid neck 6 and base-piece 7, the base-piece being adapted to be placed against and secured to the side of the tank by means of nails or screws. This head 4 is provided with a liquid-chamber 8, from which the pipe 3 leads, and a tubular right-angled or elbow-joint piece 9 is fitted revolubly in this head-piece 4 in seats 10 and 11 therefor at the respective sides of the chamber 8, through which the tubular joint-piece 9 extends transversely medially. The tubular joint-piece is provided with ports 12 opening through its side walls into the chamber 8. The joint-piece 9 is also provided with an annular flange 13, and packings 14 around the joint-piece 9 fit against the flange on both sides thereof and fill the annular space between the joint-piece 9 and the surrounding wall of the stuffing-box 15, formed on the head 4. A gland 16 about the joint-piece 9 is held to the stuffing-box by screws and compresses the packing within the stuffing-box. By the construction just described the joint-piece 9 is fitted and held water-tight and rotatably in the head 4 in such manner that it discharges into the chamber 8.

A tubular arm 17 is coupled onto the joint-piece 9 conveniently and advisably by means of the smaller tubular elbow-joint 18, which elbow-joint for convenience of connection is screw-threaded terminally. At its outer end the swinging tubular arm 17 has an intake port comprising the filter 19. (Shown in Fig. 1 and illustrated in detail in Figs. 4 and 5.) This intake filter-port is advisably constructed with metal convex circular heads 20, held to each other by a number of binding-rods 21, fixed in terminal rings 22, the rings being placed against and secured to the margins of the heads 20, whereby the skeleton of a cylindrical chamber is formed. A sheet-metal sieve or screen 23, secured to the heads 20 at its edges and passing around the rods 21, forms the sides of the filter, whereby water or liquids may pass freely from the exterior into the chamber. Longitudinally of this chamber and centrally thereof there is a duct 24, formed of two sections of pipe 25 25, connected together centrally by a T tubular head 26, in which the inner ends of these pipes are secured by screw-thread, the outer ends of these pipes 25 passing, respectively, through the heads 20 and being secured therein and thereto by screw-caps 27 turning thereon. The tubular swinging arm 17 enters the filter-chamber through the screen side thereof and is screw-threaded into the cross-head 26, whereby this swinging arm opens into the duct 24. The pipes 25 on the T-head 26 are provided in their sides with transverse slots 28 opening into the chamber of the filter. The interior of the filter-chamber is advisably filled with some filtering or purifying material, as preferably charcoal 29, through which the water or liquid may percolate and be clarified.

The filter intake-port 19 is to be automatically located and held in the water or liquid at a little distance below the surface thereof, so that it will be constantly supplied with the water or liquid at some distance above the bottom, where the sediment, if any, is found, and a little below the surface, on which any floating foreign matter may rest, and for this purpose a float 30 is attached to the filter in such relation thereto that the float resting on the surface of the water will support the filter and the intake-port of the arm 17 at a little distance below such surface. For this purpose the hollow sheet-metal float 30 is provided with a boss adapted to receive therein the screw-threaded tang 31, fixed on the bail 32, whereby the float is secured rigidly to the bail, which bail straddles the filter, and its ends being turned inwardly enter pivotally sockets therefor centrally in the screw-caps 27 on the ends of the pipe 25. This bail 32 may be made of heavy elastic wire, so that its ends can be sprung into the sockets in the caps 27 and, if desired, can by reason of its elasticity be readily detached therefrom.

What we claim as our invention is—

1. A device for discharging liquid from receptacles, comprising a swinging tubular arm supported pivotally within the receptacle to a non-swinging discharging-tube, a laterally-expanded chamber on the free end of the swinging tubular arm and opening thereto and having a port to take liquid from the receptacle, a bail having its separated ends pivoted in horizontally-exposed ends of the chamber, and a closed hollow float secured to the medial portion of the bail, the float being adapted to be supported buoyantly by the liquid in the receptacle and to maintain the port-chamber in the liquid movably with reference to and at a distance below the float.

2. In combination, a liquid-holding receptacle, a discharge-pipe entering the receptacle and secured to the wall thereof medially of its height, a swinging tubular arm pivoted to and discharging into said wall-attached pipe, a laterally-expanded filtering intake-port chamber secured to and forming the free end of the swinging tubular arm, socketed members on the horizontally-exposed ends of the intake-chamber, an elastic bowed bail the ends of which enter pivotally the sockets of the socketed members of the chamber, and a closed hollow float secured medially to the bail adapted to float on the suface of the liquid above the filtering-chamber, and to support suspendedly the intake-chamber in the liquid at a distance below the surface of the liquid.

3. In combination, a liquid-holding receptacle, a discharge-pipe entering and secured to the receptacle, a swinging tubular arm pivoted and discharging in said secured pipe, a drum-like filtering intake-port chamber secured to and forming the free end of the swinging tubular arm, a bowed bail the ends of which are pivoted in the horizontally-exposed ends of the intake-chamber, a closed hollow float secured medially to the bail and adapted to float on the surface of the liquid at a distance above the intake-chamber, and to maintain the intake-chamber in the liquid at a constant distance adjacent to but below its surface and movable with reference to the float.

In testimony whereof we affix our signatures in presence of two witnesses.

HENRY NICHOLS.
CHARLES G. NICHOLS.

Witnesses:
ISABEL E. NICHOLS,
W. H. KREISS.